United States Patent [19]

Secor

[11] Patent Number: 5,103,978
[45] Date of Patent: Apr. 14, 1992

[54] COVERS FOR VIDEOCASSETTES, VIDEOCASSETTE JACKETS AND SIMILAR LIKE ARTICLES

[76] Inventor: Nancy A. Secor, 25 Flamingo Dr., Rochester, N.Y. 14624

[21] Appl. No.: 537,603

[22] Filed: Jun. 14, 1990

[51] Int. Cl.5 .......................................... B65D 85/672
[52] U.S. Cl. .................................... 206/387; 206/459; 40/312
[58] Field of Search .............. 206/312, 387, 459, 444, 206/491, 575; 40/312; 281/29; 283/64

[56] References Cited

U.S. PATENT DOCUMENTS

| | | | |
|---|---|---|---|
| 3,087,605 | 4/1963 | Kester | 40/312 |
| 4,445,612 | 5/1984 | Shepherd . | |
| 4,445,634 | 5/1984 | Sato | 206/387 |
| 4,501,359 | 2/1985 | Yoshigawa . | |
| 4,520,927 | 6/1985 | Sato | 206/387 |
| 4,688,673 | 8/1987 | Yabe . | |
| 4,717,021 | 1/1988 | Ditzig | 206/387 |
| 4,757,901 | 7/1988 | Woods . | |
| 4,784,264 | 11/1988 | Sykes . | |
| 4,821,881 | 4/1989 | Yabe . | |
| 4,867,372 | 9/1989 | Patterson | 206/459 |
| 4,911,298 | 3/1990 | Miyagawa et al. | 206/387 |
| 4,953,779 | 9/1990 | Densen | 206/459 |

FOREIGN PATENT DOCUMENTS

2030545  4/1980  United Kingdom ............... 206/387

Primary Examiner—David T. Fidei
Attorney, Agent, or Firm—Marjama & Pincelli

[57] ABSTRACT

A foldup cover blank for placement about a jacket for holding a cassette. The jacket may include indicia which corresponds to a label which is applied to the jacket. The foldup cover blank may be provided as kit which includes a blank cassette.

17 Claims, 5 Drawing Sheets

COVERS FOR VIDEOCASSETTES, VIDEOCASSETTE JACKETS AND SIMILAR LIKE ARTICLES

BACKGROUND OF THE INVENTION

This invention relates to videocassette audiocassettes, covers for cassettes, floppy disks and other similar type articles.

Modern technology has provided relative inexpensive and easy to use equipment for the general consuming public for making videotapes, audiocassette, and computer disks. As a result individuals are building large libraries of videotapes, audiotapes and/or computer disks. A serious problem encountered with such large libraries has been the proper identification, storage and protection of the cassettes and disks. Typically a user purchases a blank cassette which come prepackaged in cassette jacket. A plurality of labels are provided for placement on the spine of the jacket and on at least one place on the tape cassette whereby the user would write the appropriate information as to the contents of the recorded tape. For a user that has many tapes it has become difficult to easily and quickly identify individual cassettes that are to be placed in the appropriate associated cassette jacket due to the great similarity of appearance among blank cassettes and jackets. This may result in the misfiling of the wrong cassette in its proper associated jacket and resulting in the accidental taping over a cassette which the user desires to maintain. An additional problem with such prior art cassettes is that the written information placed on the label is difficult to read without close examination.

It is desirable to store a cassette within the jacket it comes in so as to minimize contamination to the tape which can affect the equipment and quality of the recorded information. Additionally, many of the jackets of the prior art are simply made of cardboard. Repeated removal and insertion of the cassette within the jacket can result in deterioration of the jacket thus leaving the cassette without protection from the environment.

Applicant has invented an improved blank for placement about a cassette jacket, cassettes or container for holding same, which provides improved identification of the cassette jacket which is relatively low cost, and easy to apply and improves the life of the jacket.

Various other advantages of this invention will be apparent from the following description.

SUMMARY OF THE INVENTION

In one aspect of the invention there is provided a foldup cover blank for placement about a rectangular cassette jacket. The jacket is provided with a top section, a bottom section, a left section, a right section and a back section which form a recess for receiving a cassette. The cover blank comprising:

a back panel part for placement adjacent the back section of the cassette jacket;

a right panel part for placement adjacent the right section of the cassette jacket;

a top panel part for placement adjacent the top section of the cassette jacket;

the top panel part, the back panel part and the right panel part having an inside surface and an outside surface respectively; and adhesive means placed on the inside surface of the panels for securing said cover blank to the cassette jacket.

In another aspect of the present invention there is provided a foldup cover blank for placement about a rectangular cassette. The cassette has a front surface, a rear surface, a top surface, a bottom surface, a left side surface and a right side surface. The cover blank comprising:

a back panel part for placement adjacent the back section of the cassette jacket;

a right panel part for placement adjacent the right section of the cassette jacket;

a top panel part for placement adjacent the top section of the cassette jacket;

the top panel part, the left panel part, the bottom panel part, the back panel part and the right panel part having an inside surface and an outside surface respectively; and adhesive means placed on the inside surface of the panels for securing the cover blank to the cassette jacket.

In yet another aspect of the present invention there is provided a kit for labeling, protecting and identifying a cassette, comprising in combination:

a cassette having a front surface, rear surface, top surface, bottom surface, left side surface, and right side surface;

a cassette jacket for receiving the cassette having a top section, bottom section, left section, right section and back section form, the sections forming a recessed for receiving the cassette;

a foldup cover blank for placement about the cassette jacket, a back panel part for placement adjacent the back section of the cassette jacket, a right panel part for placement adjacent to the right section of the cassette jacket, a top panel part for placement adjacent the top section of the cassette jacket, the top panel part, the back panel part and the right panel part having an inside surface and an outside surface respectively; and adhesive means placed on the inside surface of the panels for securing the cover blank to the cassette jacket.

In still another aspect of the present invention there is provided a foldup cover blank for placement about a rectangular cassette jacket, the jacket having a top section and which form a recess for receiving a disk or other similar articles, the cover blank comprising:

a back panel part for placement adjacent the back section of the cassette jacket;

a top panel part for placement adjacent the top section of the cassette jacket;

the top panel part and the back panel part and the right panel part having an inside surface and an outside surface respectively; and adhesive means placed on the inside surface of the panels for securing the cover blank to the cassette jacket.

In another aspect of the present invention there is provided a blank cassette kit having a predetermined identifying theme, comprising in combination:

a blank cassette having front surface, a rear surface, a top surface, a bottom surface, left side surface, and a right side surface;

a label as secured to the cassette jacket having an indicia of a first theme;

a cassette jacket for receiving the cassette having a top section, bottom section, a left section, a right section and back section, the sections forming a recess for receiving the cassette, the cassette having indicia on at least one of the sections which is identical at least in form in configuration to the indicia on the label on the cassette.

DETAILED DESCRIPTION OF THE DRAWINGS

DETAILED DESCRIPTION OF THE PREFERRED EMBODIMENTS

Several embodiments of the invention will be described hereinafter with reference to the accompanied drawings.

Referring to FIGS. 1-5 there is illustrated a first cover blank 10 made in accordance with the present invention. In particular there is illustrated a foldup cover blank 10 for placement about a rectangular cassette jacket 12. Cassette jacket 12 is capable of receiving a typical prior art videocassette 14.

Figure 3:
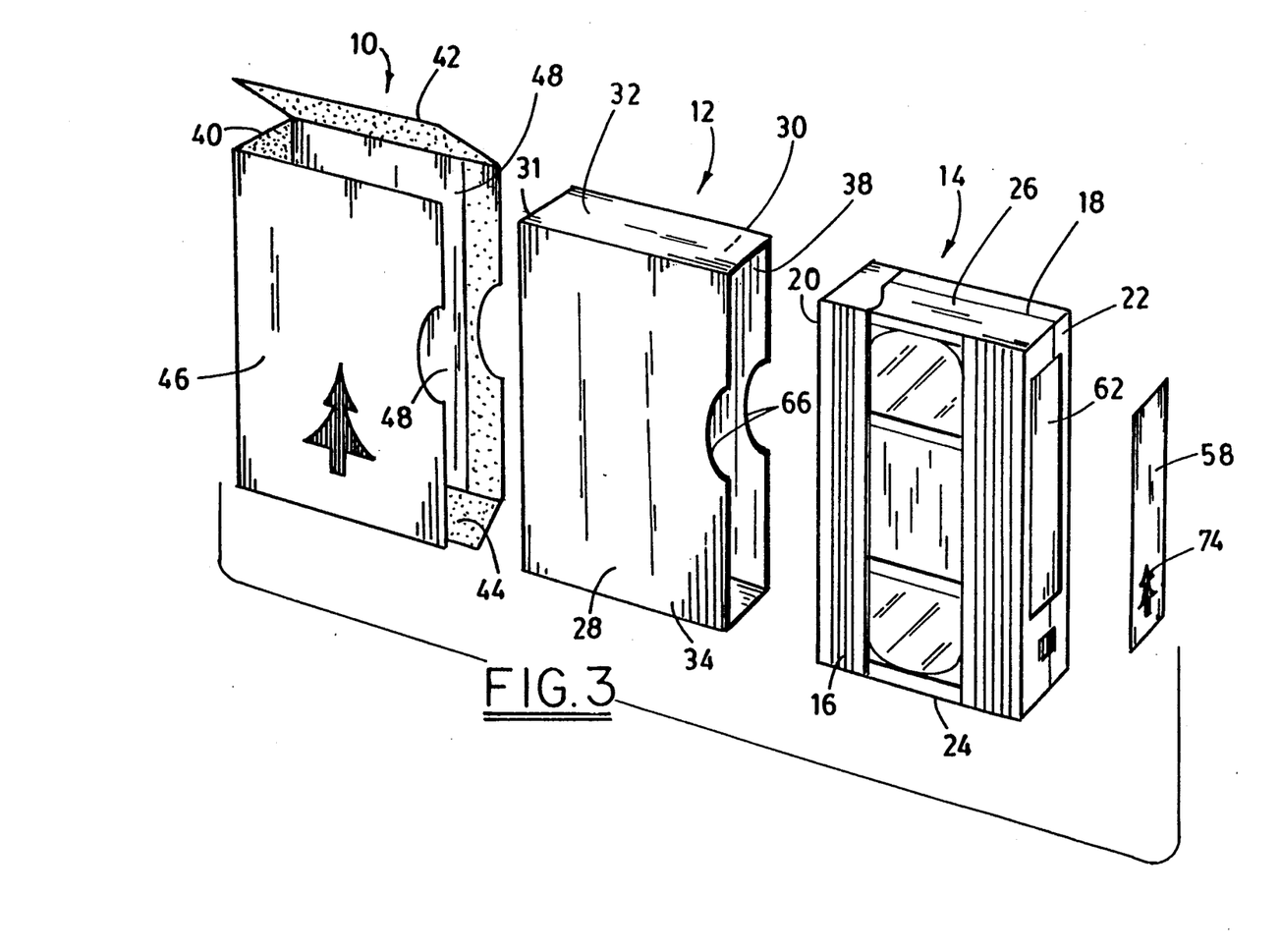
FIG. 3 is a perspective exploded view of the cover blank of FIG. 1 and its associated cover jacket and cassette.

Cassette 14 is typical of prior art VHS type cassettes. In the embodiment illustrated, cassette 14 is of plastic construction having a generally rectangular configuration. Cassette 14 has a top surface 16, bottom surface 18, a front surface 20, a back surface 22, a left side surface 24, and a right side surface 26. It is to be understood that orientation terms: top, bottom, front, rear, left and right have been used only for purpose of providing reference for describing the present invention and does not represent any particular orientation or surface of the cassette.

The cassette jacket 12 is also of conventional construction and includes a top section 28, bottom section 30, a right section 32, left section 34, and a back section 36 which form a recess 38 for receiving cassette 14. Here again, as with the cassette 14, the terms: top, bottom, right, left and back have been used merely for ease of describing the invention and that any orientation convention may be used as desired. Cassette jacket 12, as illustrated is typically made of folded paper cardboard. However, jacket 12 may be made of any desired material.

Figure 1:
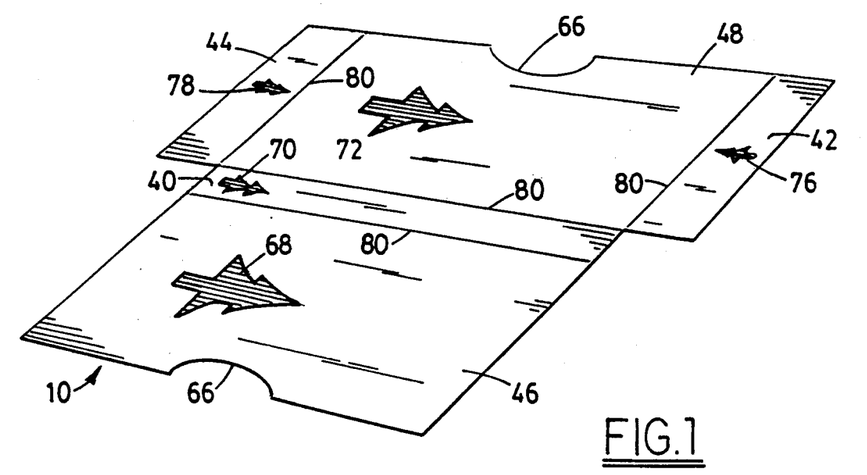
FIG. 1 is a developed perspective view of the exterior of a cover blank made in accordance with the present invention.
Figure 2:
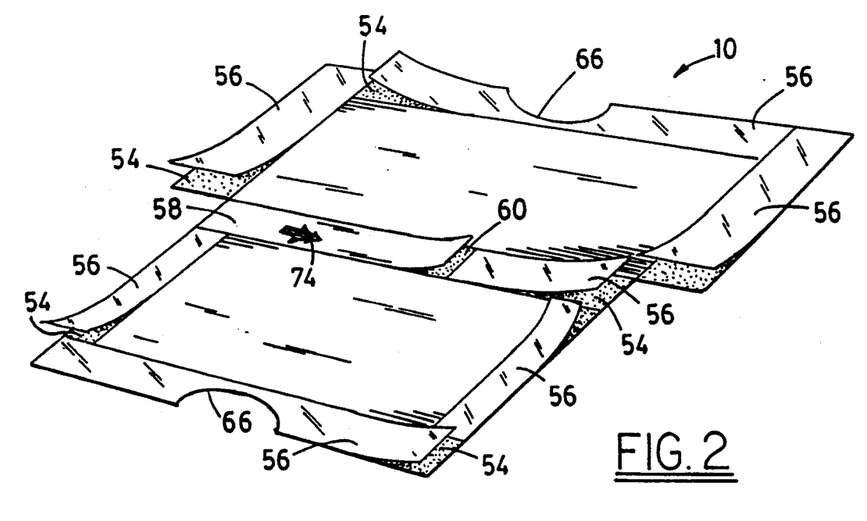
FIG. 2 is a developed perspective view of the inside surface of the cover blank of FIG. 1 with protective barrier strips partially removed.

Referring to FIGS. 1 and 2 there is illustrated a foldup cover blank 10 having various panel parts for placement and attachment to the cassette jacket 12. In the particular embodiment illustrated the foldup cover blank 10 is made of a durable paper material and comprises a plurality of substantially rectangular panel sections for placement adjacent corresponding sections of the cassette jacket 14. It is of course understood that cover blank 10 may be made of various desired materials, for example, vinyl, plastic coated paper, rigid cardboard. Foldup cover blank 10 comprises a substantially rectangular back panel part 40 which is designed for placement against back section 36, a substantially rectangular right panel part 42 for placement adjacent right section 32 of jacket 12, a substantially rectangular left panel part 44 for placement adjacent left section 34 of cassette jacket 12, a substantially rectangular top panel part 46 for placement adjacent top section 28 of cassette jacket 12 and a substantially rectangular bottom panel part 48 for placement adjacent bottom section 30 of cassette jacket.

The foldup cover blank 10 has an exterior surface 50, as illustrated in FIG. 1, and an interior surface 52, as illustrated in FIG. 2. The interior surface 52 is provided with means for securing the foldup cover blank 10 to the rectangular cassette jacket 12. In the particular embodiment illustrated the outer periphery of panel parts 40, 42, 44, 46 and 48 are provided with an adhesive layer 54 which allows the cover blank 10 to be secured to the cassette jacket 12. In the preferred embodiment illustrated, the adhesive layer 54 in these regions is protected by peel off barrier strips 56 which allows the adhesive to remain tacky and prevents contamination thereof prior to application of the cover blank 10. In the particular embodiment illustrated, the back panel part 40 also has an outer identification label 58 which has an adhesive layer 60. The identification label 58 is designed to be placed on the back side of barrier strip 56 which covers rear surface 22. In the particular embodiment illustrated, as is commonly done in prior art, a small recessed area 62 is provided in cassette 14 for receiving identification label 58. In the preferred embodiment the size and configuration of identification label 58 is designed so as to fit within the recessed area 62. Since identification label 58 has an adhesive layer 60 on the other side, it can be immediately secured to the cassette 14. Thus, the peel off label barrier strip 56 is placed on the back panel part 40 serves two functions. First, it protects the adhesive layers 54 from contamination prior to use and secondly, allows for placement of an identification label 50 to be used on the cassette 14. In the particular embodiment illustrated, the foldup cover blank 10 is provided with cutout sections 64 designed generally to correspond with the cutout section 66 of jacket 12. This of course allows the cassette to be freely removed from within the jacket 12. It is to be understood that the size and shape of cutouts 64, may be varied as desired to correspond to typically shaped cutout sections in cassette jacket. Alternatively, the top and bottom panel parts 46, 48 may eliminate these cutout sections leaving to the user to cutout the portion that corresponds to the cutout configuration present in the jacket on which it is to be applied.

In order to more readily identify the type of cassette that is being stored and also for easily identifying a jacket 12 with associated cassette 14, common indicia is provided on the exterior surface of the cover blank 10 which corresponds to the indicia placed on the identification label 58 which is secured to the cassette. In the particular embodiment illustrated, there is provided indicia 68, 70, 72, 74, 76 and 78, right panel part 42, left panel part 44 to top panel part 46, bottom panel part 48, back panel part 40 and identification label 58. It can be seen that the indicia 68-74 are all identical except different in size to accommodate the particular portion of the cover blank. For the purposes of illustration, the indicia 68, 70, 72, 74, 76 and 78 is in the shape of a tree. This could signify a particular theme of the material on the tape, for example, dealing with nature or simply for the purposes of identification. It is to be understood that various indicia having different themes may be used, for example, a silhouette of a wedding gown to indicate for wedding themes, a baseball and/or bat for baseball theme, a child for children, etc. In the preferred embodiment illustrated, indicia is provided on each of the panel parts 40, 42, 44, 46 and 48. However, if desired, indicia may be placed on either the top or bottom panel parts 46, 48, back panel part 40 and at least one of the right or left panel parts 42, 44.

Figure 4:
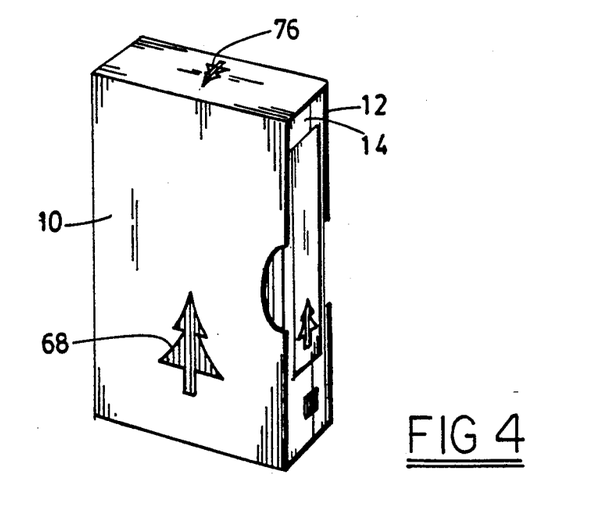
FIG. 4 is an assembled perspective view of the cover blank, jacket and cassette of FIG. 3.

When the cassette 14 is placed within the cassette jacket 12, the particular tape which it is directed can be readily identified by the indicia placed on the jacket. Since the indicia is placed on each side, the particular type of cassette placed therein can be readily identified by the viewer. Additionally, indicia can be used to readily identify a particular theme of the particular cassette 14 even while stored in its associated storage jacket.

It is, of course, understood that other areas of the cover blank 10 may be provided with areas upon which the user may place additional information such as written material as is customarily done in prior art. It is also to be understood that various multitudes of other configured indicia may be selected which will readily identify the jacket with the cassette. In addition, the colors of the indicia may be varied to further assist in identification. For example, triangles, squares or stars may be provided in a variety of different colors. Thus, a person can purchase a whole array of a common theme, for example, stores, having a variety of different identifying colors. In addition to color variation, patterns within the indicia may be varied, for example, providing stripes or checkered pattern on the indicia.

The present invention also provides a quick and easy means of applying a foldup cover blank to the cassette. In the particular embodiment illustrated, fold lines 80 are provided between panel parts 40-48. These fold lines 80 may be actual pre-crease lines or just a mere indication of where the cover blank is to be folded. A single cover blank 10 would be used with a single cassette jacket 12 and cassette 14. The cover blank would be removed from its package and the center peel off barrier strip 56 with an identification label 58 placed on the back side of the barrier strip. This part would then be secured directly to the back section 36 of jacket 12. The remaining panel parts would be applied in sequential order, for example, the right panel part, left panel part, top panel part and bottom part would be secured to the adjacent section of jacket 12. It is of course understood that the order in which each paneled part is secured to its respective section may be varied as desired. Thus once completed, the jacket 12 is provided with a protective cover blank which can also serve to assist in the extending the life of the jacket and also provides quick and easy means of identification of the jacket with respect to its corresponding cassette 14.

Figure 5:
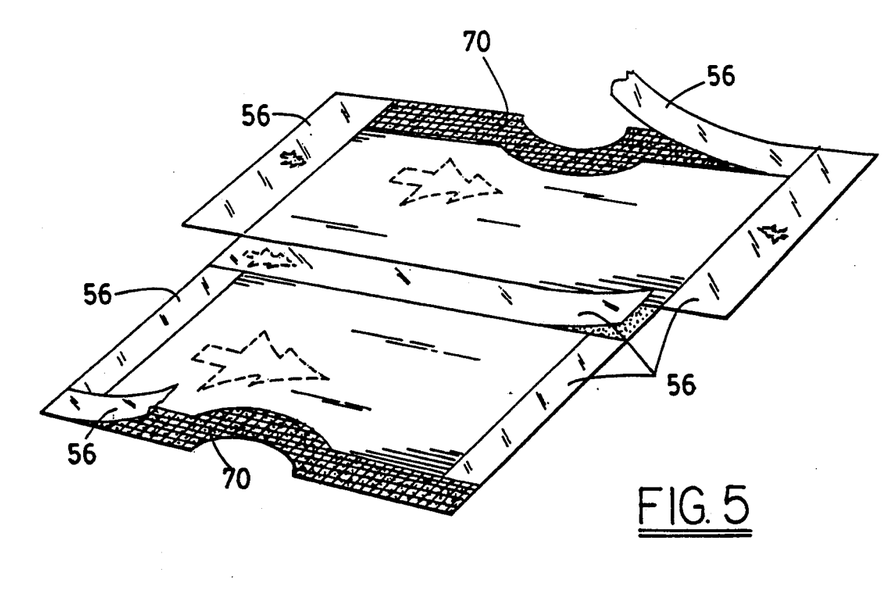
FIG. 5 is a view similar to FIG. 2 illustrating some of the protective barrier strips partially removed which are used to protect the adhesive portions of the cover blank.

In order to further strengthen the durability of the jacket the portions of the cover blank 10 having adhesive may be reinforced with a fabric means or web 70 as illustrated in FIG. 5. For example, a plurality of parallel cords placed in a direction parallel to the longitudinal edges of the panel parts in the adhesive layer. It is of course to be understood that any appropriate type fabric reinforcement may be used as desired.

Figures 6, 7:
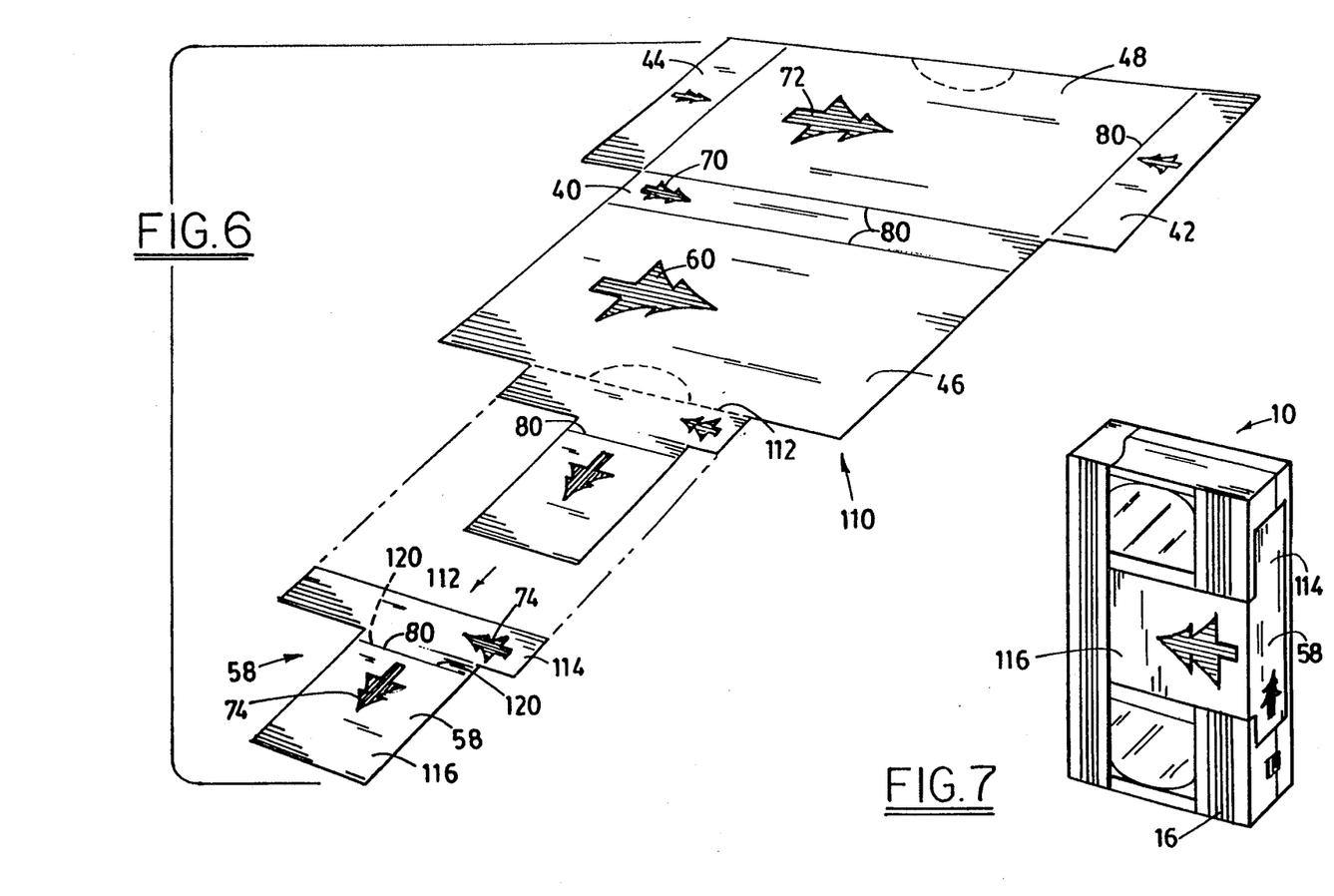
FIG. 6 is a developed perspective view of the outside surface of a modified cover blank made in accordance with the present invention.
FIG. 7 is a perspective view of a cassette illustrating how the label portion of the cover blank of FIG. 6 is applied thereto.

Referring to FIGS. 6 and 7 there is illustrated a modified foldup cover blank 110 made in accordance with the present invention. Foldup cover blank 110 is similar to foldup cover blank 10 like numbers indicating like parts. In this embodiment the identification label 58 instead of being placed on the backside of the barrier strip 56 is a part of the cover blank 110. A tear line 112 is provided for removing identification label 58 from the remaining portion of the cover blank. In this embodiment cutouts 64 are not provided, leaving to the user to provide the appropriate cutouts to correspond to the desired location of the cutouts on the associated jacket. Additionally, in this embodiment, the identification 58 label is substantially T-shaped having a narrow section 114 for placement along the rear surface 22 of cassette 16 and a wide section 116 designed to be placed on the top surface 16. Identification label 58 is provided with a fold line 80 to designate the edge at which the identification label is to be wrapped about the corner between the top surface 16 and rear surface 22. If desired, the identification label 58 may be provided with a tear line 120 in place of the fold line 80 provided so that the wide section 116 may be placed in the desired location of the top surface 16 of cassette 10. The backside of identification label 58 is provided with appropriate peel off sections to expose an adhesive layer placed on the inside surface. Once the peel off barrier strip 56 (not shown) is removed, the identification label 58 is simply applied to the cassette 14 by pressing it against cassette 14 in the appropriate locations.

Figures 8, 9:
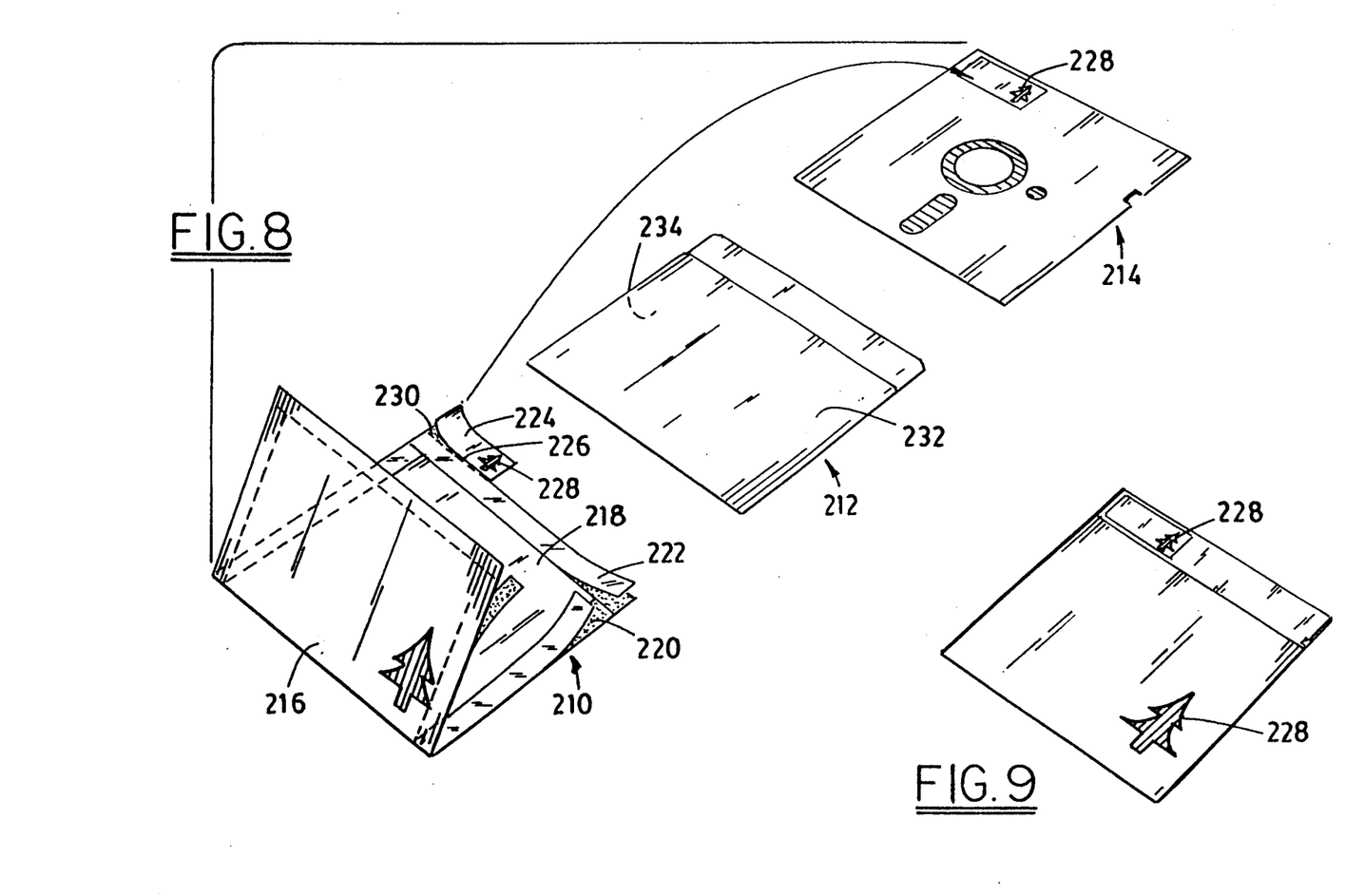
FIG. 8 is a perspective exploded view of yet another modified cover blank made in accordance with the present invention for covering a computer disk jacket and associated computer disk.
FIG. 9 is a perspective view of the assembly of FIG. 8.

Referring to FIGS. 8 and 9 there is illustrated yet another modified foldup cover blank 10 made in accordance with the present invention. In this particular embodiment, cover blank 210 is designed to be placed about a jacket 212 which holds a computer floppy disk 214. Cover blank 210 comprises a front panel section 216 and a back panel section 218. The periphery of the interior surface is provided with an adhesive layer 220 upon which a protective peel off barrier strips 222 are placed. Once the barrier strips 222 are removed, the adhesive layer will be ready for attachment to the jacket 212. In the particular embodiment illustrated, an identification label 224 is integrally formed as a part of the cover blank 210. A tear line 226 is provided for removing identification label 224 therefrom. The identification label 224 includes an adhesive layer secured to the inside surface and is kept clean by base section 230.

In the use of the subject cover blank 210, the identification label 224 section is initially removed from the cover blank 20. Then the barrier strips 222 are removed from either the front panel part or back panel part and then secured to the respective or front surface 232 or back surface 234 of jacket 214. After the cover blank 210 is applied to the jacket 212, the label 224 may then be placed on the floppy disk 214 as illustrated so that the identification label 224 may be viewed when the floppy disk 214 is placed securely within the jacket 212. FIG. 9 illustrates the assembled floppy disk 214, cover blank 210 and disk jacket 212. As can be seen, the jacket 212 and floppy disk 214 have common indicia 228. The identification label 224 may of course be provided with a portion for user to provide any notes or further identification he may so desire.

It is also understood in the embodiment illustrated the identification label section 224 is a separate tear off section, it may be made or placed on the backside of the peel off barrier strip 56 as illustrated in embodiment of FIG. 2.

Thus, it can be seen from the forgoing, that the present invention can be sold as a kit for labeling, protecting and identifying the cassette which includes a blank cassette, a cassette jacket and a foldup cover blank or placement about the cassette and cassette jacket. Such a kit can be sold with an indicia of a common theme, that is, a logo of a particular sport coming in a variety of different colors, or a single pack may be provided having a variety of different items, one directed for weddings, one directed for children, one directed for sports, one directed for hobbies, etc. Thus, a particular theme may be placed on a video cassette which typically is capable of taping up to six hours. This can be very useful with many recorders sold to the general consuming public and that many models have initial smaller cassettes of less time, for example, 20 minutes that could be which is typically added to a larger type VHS tapes. Thus, certain tapes can be specially set aside so that the development of a child or a sports career of an individual may be placed on a single common tape which can be easily identified in catalog by the user.

While a kit comprising a cassette, cover jacket and labels may be sold which requires assembling later on, a kit may be provided for the user wherein appropriate indicia and/or logo are preprinted or applied to the jacket and blank cassette for convenient use by the consumer. Thus, the consumer can buy a prepackaged kit of blank tapes for a single theme or a variety of themes which can be easily used and cataloged by the user, thus avoiding necessity of applying a cover jacket to separately purchased cassette blanks.

It is, of course, to be understood so that further modifications may be made with departing from the scope of the present invention. For example, but not by way of limitation, videocassette type and jackets may be used such as 8 mm videocassettes, Beta video cassette, jackets made of plastic type construction. The present invention being limited by the attached claims.

I claim:

1. A foldup cover blank for placement about a rectangular cassette jacket, said jacket having a top section, a bottom section, a left section, a right section and a back section which form a recess for receiving a cassette, said cover blank comprising:
   a back panel part for placement adjacent said back section of said cassette jacket;
   a right panel part for placement adjacent said right section of said cassette jacket;
   a top panel part for placement adjacent said top section of said cassette jacket;
   said top panel part, said back panel part and said right panel part having an inside surface and an outside surface respectively; and
   adhesive means placed on the inside surface of the panels for securing said cover blank to said cassette jacket; and
   removable label means secured to said cover blank, said removable label means for permanent placement on said cassette, said label means and the outside surface of said cover blank each having indicia permanently secured thereon of a common theme for readily identifying said cassette for placement in said cassette jacket.

2. A foldup cover blank according to claim 1 further comprising:
   a left panel part for placement adjacent said left section of said cassette jacket; and
   a bottom panel part for placement adjacent said bottom section.

3. A foldup cover blank according to claim 1 wherein said adhesive means is placed substantially around the periphery of said cover blank.

4. A foldup cover blank according to claim 1 wherein said adhesive means prior to being secured to said jacket is covered by a removable peel off protective layer.

5. A foldup cover blank according to claim 1 wherein said adhesive means contains fabric reinforcement.

6. A foldup cover blank according to claim 1 wherein said removable label means for said cassette and the outside surface of said cover blank each having substantially identical indicia for readily identifying said cassette for placement in said cassette jacket.

7. A foldup cover blank according to claim 1 wherein fold lines are provided between said panel parts to assist folding said panel parts about said jacket.

8. A kit for labeling, protecting and identifying a cassette, comprising in combination:
   a cassette having a front surface, rear surface, top surface, bottom surface, left side surface, and right side surface;
   a cassette jacket for receiving said cassette having a top section, bottom section, left section, right section and back section form, said sections forming a recessed for receiving said cassette;
   a foldup cover blank for placement about said cassette jacket, a back panel part for placement adjacent said back section of said cassette jacket, a right panel part for placement adjacent to said right section of said cassette jacket, a top panel part for placement adjacent said top section of said cassette jacket, said top panel part, said back panel part and said right panel part having an inside surface and an outside surface respectively; and
   adhesive means placed on the inside surface of the panels for securing said cover blank to said cassette jacket; and
   removable label means secured to said cover blank, said removable label means for permanent placement on said cassette, said label and said cover blank each having indicia permanently secured thereon of a common theme for readily identifying said cassette for placement in said cassette jacket.

9. A foldup cover blank according to claim 8 further comprising:
   a left panel part for placement adjacent said left section of said cassette jacket; and
   a bottom panel part for placement adjacent said bottom section.

10. A foldup cover blank according to claim 8 wherein said adhesive means is placed substantially around the periphery of said cover blank.

11. A foldup cover blank according to claim 8 wherein said adhesive means prior to being secured to said jacket is covered by a removable peel off protective layer.

12. A foldup cover blank according to claim 8 wherein fabric reinforcement is provided in at least a portion of said adhesive means.

13. A foldup cover blank according to claim 8 wherein said label means comprising of an adhesive label.

14. A foldup cover blank according to claim 13 wherein said adhesive label for said cassette is placed on the back side of the peel off protective layers.

15. A foldup cover blank according to claim 14 wherein said adhesive label or said cassette and the outside surface of said cover blank each having substantially identical indicia for readily identifying said cassette for placement in said jacket.

16. A foldup cover blank according to claim 8 wherein fold lines are provided between said panel parts to assist folding said panel parts about said jacket.

17. A foldup cover blank according to claim 1 wherein said removable label means comprises a label having an adhesive surface on one side which is covered by a peel off protective layer designed to be initially secured to an adhesive surface on the backside of said cassette jacket.

* * * * *